March 30, 1965 W. B. DELLER ETAL 3,176,273

STATIC SWITCHING ARRANGEMENTS OF THE CROSS-POINT TYPE

Filed Aug. 28, 1961 2 Sheets-Sheet 1

3,176,273
Patented Mar. 30, 1965

3,176,273

STATIC SWITCHING ARRANGEMENTS OF THE CROSS-POINT TYPE

William Bernard Deller, Mottingham, London, and Harold James Stirling, Orpington, England, assignors to Associated Electrical Industries Limited, London, England, a British company Filed Aug. 28, 1961, Ser. No. 134,278
Claims priority, application Great Britain, Sept. 2, 1960, 30,371/60
2 Claims. (Cl. 340—166)

Figure 1:
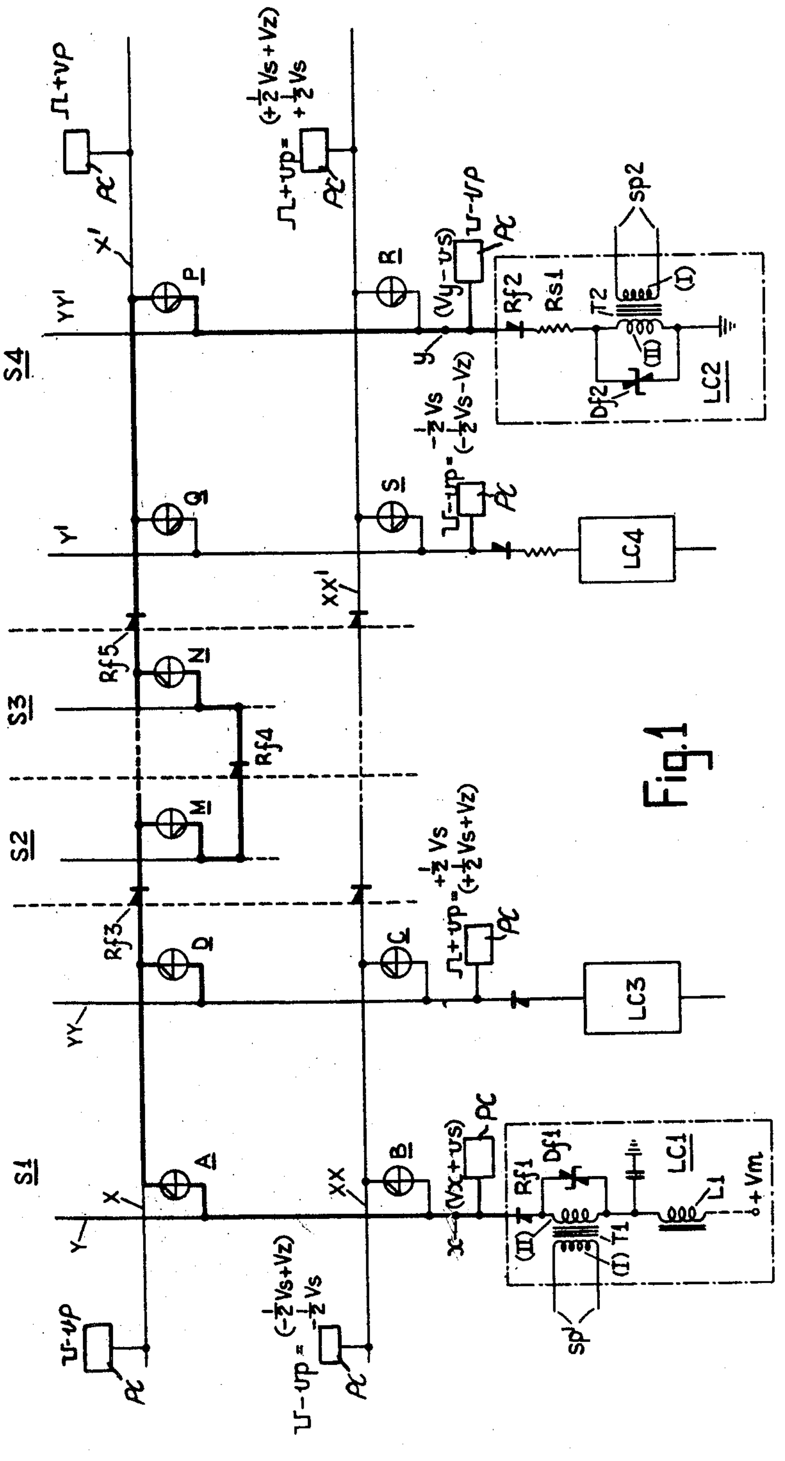

This invention relates to static switching arrangements of the cross-point type such as may be employed in switching systems, for example automatic telephone exchange systems, affording a plurality of possible communication paths which can be taken into use, as required, to establish connections between terminal circuits.

In general a static switching arrangement of the cross-point type as herein considered basically comprises two groups of conductors which constitute, in effect, a two-co-ordinate array of conductors forming a plurality of so-called cross-points corresponding to the different combinations of two conductors obtained by taking the conductors one from each group at a time. At each of these cross-points, a so-called cross-point circuit, which comprises one or more circuit components of a static nature, includes connections to the two array conductors that form the particular cross-point and serves as a static switching element having an "off" (or high impedance) condition and an "on" (or low impedance) condition so far as the transmission of communication currents (for example speech currents) between these two conductors is concerned. A complete switching system may comprise a number of tandem connected switch stages each comprising a number of these basic co-ordinate or cross-point switching arrangements.

A static switching component which is suitable for use in a static switching arrangement of the cross-point type is a form of semi-conductor device known as a four-zone (or four-layer) diode. Such a device is a two-terminal device which has a definite "off," or high impedance, condition and a definite "on," or low impedance, condition. Change from the high to the low impedance condition can be effected by the application of a breakdown (or "firing") voltage to the device which thereafter can be held in the low impedance condition by maintaining a relatively low holding current through it, but which reverts to the high impedance condition immediately upon the cessation of such holding current.

Where four-zone diodes are employed as the static switching components in a two-co-ordinate array, cross-point selection may be effected by applying respectively to the two array conductors that form the cross-point, substantially equal amplitude positive-going and negative-going firing pulses, the amplitude of each of these pulses being at least one-half of the amplitude of the breakdown voltage required to change the four-zone diode at the cross-point to its low impedance condition. With this method of selection all the cross-point diodes connected to the array conductor receiving the positive-going firing pulse and likewise all the cross-point diodes connected to the array conductor receiving the negative-going firing pulse will have one-half of the breakdown voltage appearing across them, but only the particular diode at the cross-point concerned has the full breakdown voltage across it and therefore only this diode is changed to the "on" condition to establish a low impedance connection between the two array conductors. Upon the cessation of the firing pulses a maintaining circuit established in respect of the selected cross-point provides a holding current for maintaining the four-zone diode in the "on" condition.

With presently known processes of manufacture, four-zone diodes having a relatively low breakdown voltage are more readily manufactured than those having a high breakdown voltage. Furthermore, the four-zone diodes produced have breakdown voltages which vary over a relatively wide range with respect to a nominal value. Thus if a static switching arrangement of the cross-point type could be designed so that four-zone diodes having breakdown voltages which vary, as between the diodes themselves, over a relatively wide range about a fairly low nominal value would be acceptable for use thereon, then a greater proportion of such diodes as manufactured could be utilised with consequent substantial economic advantage. However, as will be considered in some detail hereinafter, when static switching arrangements using four-zone diodes are employed in some practical forms of switching systems, standing voltages of appreciable amplitude may be present on their array conductors as a result of the holding current flowing in the maintaining circuits established in respect of selected cross-points, and these standing voltages can necessitate the use of cross-point diodes having a higher breakdown voltage than would otherwise be required in order to minimise the possibility of spurious cross-point selection caused by an applied firing pulse being effective in conjunction with a standing voltage to produce a voltage of breakdown amplitude across a diode.

With a view to enabling cross-point diodes having a lower breakdown voltage to be used for a given maximum standing voltage, cross-point selection in a static switching arrangement of the cross-point type using four-zone diodes is achieved in accordance with the present invention by applying to the two array conductors concerned respective positive-going and negative-going firing pulses which are unequal in amplitude but which together give a combined voltage at least as great as the breakdown voltage of the diodes, the respective amplitudes of the pulses and their points of application to the arrangement being such that either of these pulses, in the absence of the other, can produce across any cross-point diode, in conjunction with any standing voltage likely to be present in the arrangement, a voltage which is significantly less than the breakdown voltage for the diode.

Figure 2:
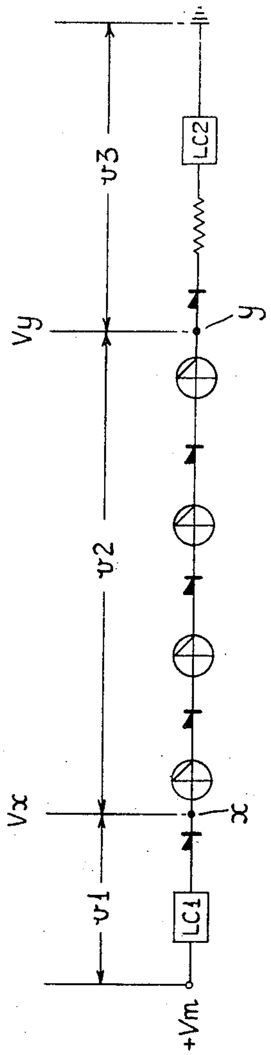

In order that the invention may be more fully understood reference will now be made to the accompanying drawing in which:

FIG. 1 is a circuit showing several tandem-connected static switching arrangements employing four-zone diodes, through which a communication path can be established; and FIG. 2 is a diagram illustrating the voltages present at various points in a communication path established in the circuit of FIG. 1.

Referring to FIG. 1, two terminal circuits LC1 and LC2 suitable for transmitting and receiving A.C. intelligence (speech) currents are interconnected over a communiaction path (shown in heavy line) which is established through four tandem-connected static switching arrangements S1 to S4. For the sake of simplicity there is shown in the switching arrangement S1 only two conductors X and XX of one of the two groups of array conductors concerned, and only two conductors Y and YY of the other of these two groups, together with the four cross-points A, B, C and D pertaining to these conductors; but it will of course be appreciated that there may in practice be ten or more conductors in each of the two groups and correspondingly one hundred or more cross-points. The switching arrangement S4 is similarly represented by two pairs of conductors X', XX' and Y', YY' and the appertaining cross-points P, Q, R and S, while the intermediate switching arrangements S2 and S3 are represented only by the particular cross-points (M and N) by which the communication path is extended through them. Each of the cross-points referred to is constituted by an individual four-zone diode.

The terminal circuit LC1 is associated with the array conductor Y in the switching arrangement S1 and comprises a coupling transformer T1 having two windings (I, II) for coupling a pair of speech wires *sp*1 to the conductor Y, an isolating rectifier R*f*1 for preventing voltages of positive potential on the conductor Y from feeding back into the terminal circuit LC1, a choke coil L1 for preventing A.C. intelligence currents feeding into a maintaining voltage supply through its positive terminal +V*m*, and a decoupling capacitor C1 for decoupling the A.C. intelligence currents to earth. Connected across the winding (II) of the coupling transformer T1 is a double Zener diode D*f*1 which serves to limit the peak voltage produced by A.C. intelligence currents to its own break-down voltage. The line circuit LC2 similarly comprises a coupling transformer T2 for coupling a pair of speech wires *sp*2 to the conductor YY' and having a double Zener diode D*f*2 connected across its winding (II), and an isolating rectifier R*f*2. There is no choke coil or decoupling capacitor in the circuit LC2 which, however, includes a signalling resistor R*s*1 across which signalling voltages can be developed for utilisation in any suitable manner. The established communication path includes the cross-point diodes A, M, N and P, and three isolating rectifiers R*f*3, R*f*4 and R*f*5 located respectively between adjacent switching arrangements.

With the communication path established as shown by the application of appropriate firing pulses +*vp* and −*vp* to the particular array conductors such as X, Y and X', YY' (pulse applying circuits for this purpose being indicated by the rectangles PC and taking any suitable form), a holding current for maintaining the cross-point diodes A, M, N and P in their low impedance condition flows through the path from the terminal +V*m* in the circuit LC1 to earth in the circuit LC2. Due to this flow of holding current a potential gradient is set up between one end of the path and the other, resulting in standing voltages being present at various points along the path. The points of standing potential which are of importance wtih regard to what minimum value of breakdown voltage four-zone diodes suitable for use as the cross-point diodes can have, are the point *x* at the high potential end of the path and the point *y* at the low potential end. As will be seen in the diagram shown in FIG. 2, the point *x* is at a standing potential V*x* which is equal to V*m* minus the voltage *v*1 dropped across the components of the circuit LC1, and the point *y* is at a standing potential V*y* which is equal to V*x* minus the voltage *v*2 dropped across the series-connected cross-point diodes A, M, N and P and the intervening isolating rectifiers R*f*3, R*f*4, and R*f*5. Equivalently, the standing potential V*y* is equal to the voltage *v*3 dropped across the components of the circuit LC2. In order that the maintaining voltage can drive a current of holding magnitude through the components connected in, or in series with, the communication path, the voltage V*m* may have to be fairly high: this means that the voltages V*x* and V*y* are proportionately high. Moreover, the flow of A.C. intelligence currents in the communication path can vary the voltages V*x* and V*y* by a value +*vs*, where *vs* is the peak voltage produced by these currents.

The total possible voltage V*x*+*vs* that can exist at the point *x* may be of the order of one-half of the breakdown voltage (½V*s*) of a certain type of cross-point diode that might be used in the static switching arrangements and therefore since this voltage is present at one side of all the "free" cross-point diodes, such as the one at B, which are connected to the conductor Y, a negative-going firing pulse of one-half of the breakdown voltage applied to the other array conductor to which any one of these diodes is connected could result in this diode being spuriously operated to its low impedance condition. For example, consider the establishment of another communication path between two further terminal circuits LC3 and LC4 using the cross-points C and S (together with two cross-points not shown in the switching arrangements S2 and S3). If, in the switching arrangement S1, in accordance with existing practice, a negative-going firing pulse −*vp* of amplitude −½V*s* is applied to the array conductor XX and a positive-going firing pulse +*vp* of amplitude +½V*s* is applied to the array conductor YY, to operate the diode at the cross-point C to its low impedance condition, then the algebraic sum of the voltages −½V*s* and (V*x*+*vs*) across the diode at the cross-point B could spuriously operate this diode to its low impedance condition. However, in applying the present invention the negative-going firing pulse −*vp* is made less in amplitude than ½V*s* by a certain voltage, say V*z*, while the positive-going firing pulse +*vp* is made greater in amplitude than ½V*s* by this voltage V*z*. In consequence, whereas the voltage across the diode at the cross-point C is still V*s*, the voltage across the diode at cross-point B will be the algebraic sum of voltages (−½V*s*+V*z*) and (V*x*+*vs*), which is a voltage smaller by the voltage V*z* than the voltage which was previously across this diode, when equal amplitude firing pulses were used. Therefore, for a given standing voltage at the point *x*, four-zone diodes having a lower breakdown voltage (V*s*) than hitherto can be employed.

In the following numerical examples illustrating the merit of the present invention, let it be assumed that V*x* equals 9 volts, V*y* equals 1 volt, and *vs* equals ±6 volts. Also there is a tolerance of, say, ±5% in the breakdown voltage V*s* of the cross-point diodes to be taken into account, so that a firing voltage V*p* of suitable breakdown magnitude for the diodes has to be not less than $(Vs+5\%Vs)$.

It has been found that for reliable operation of a static switching arrangement the maximum voltage which should be allowed across a cross-point diode which has not to break down should not exceed 75% of the minimum tolerance value of V*s* (i.e. 75% V*s* min.).

Thus, in the case of firing pulses of equal amplitude as previously used:

$$\tfrac{1}{2}Vp+(Vx+vs)\ngtr 75\%\ Vs \text{ min.} \qquad 1)$$

or, since V*p* is $(Vs+5\%Vs)$ and $(Vx+vs)$ equals 15

$$\tfrac{1}{2}\left(Vs+\frac{Vs}{20}\right)+15\ngtr \tfrac{3}{4}\left(Vs-\frac{Vs}{20}\right) \qquad (2)$$

equating (1) and (2): $15=\tfrac{3}{16}Vs$ and therefore $Vs=80$ volts.

This means that four-zone diodes having a nominal breakdown voltage of 80 volts are required and that, since $Vp=80+4=84$ volts, positive-going and negative-going firing pulses (±*vp*) each of 42 volts are required for satisfactory operation.

Where firing pulses of unequal amplitude are used in accordance with the present invention, let the voltage of the negative-going firing pulses be reduced by V*z* volts and the voltage of the positive-going pulses be increased by V*z* volts.

Thus, in this instance, due to the standing voltage at the point *x*:

$$-(-\tfrac{1}{2}Vp+Vz)-(Vx+vs)\ngtr \tfrac{3}{4}Vs \text{ min.} \qquad (3)$$

and due to the standing potential at the point *y*:

$$(\tfrac{1}{2}Vp+Vz)-(Vy-vs)\ngtr \tfrac{3}{4}Vs \text{ min.} \qquad (4)$$

Thus $(\tfrac{1}{2}Vp-Vz)+(Vx+vs)=(\tfrac{1}{2}Vp+Vz)-(Vy-vs)$ so that $2Vz=10$, or $Vz=5$ volts, but $Vp=Vs+5\%\ Vs$ ∴ from Equation 3

$$\tfrac{1}{2}\left(Vs+\frac{Vs}{20}\right)-5+15=\tfrac{3}{4}\left(Vs-\frac{Vs}{20}\right)$$

so that $Vs=54$ volts (approx.).

With the present invention therefore, four-zone diodes having a nominal breakdown voltage of only 54 volts, as compared with 80 volts in the former example, may be employed. It is evident that the firing voltage $Vp$ will be about 57 volts, and with $Vz=5$ volts, the positive- and negative-going firng pulses $+vp$ and $-vp$ will be about 23 volts and 33 volts respectively. From the foregoing it will be seen that, in general, the amount of asymmetry between the amplitudes of the firing pulses is about half the difference between the amplitudes of the maximum and minimum standing voltages liable to be encountered.

For the sake of simplicity the above numerical examples do not take into account other tolerances which may in practice have to be allowed.

What we claim is:

1. In a circuit arrangement comprising a plurality of coordinate switching networks each of which comprises a first array of conductors, a second array of conductors disposed in coordinate relationship with said first array and defining cross-points therewith, and a plurality of cross-point switches constituted by respective two-terminal four-zone diodes each connected between the pair of conductors defining its cross-point; means associated with each switching network for rendering conductive the diodes at selected cross-points therein thereby to establish connection between the conductors defining such cross-points but also resulting in the establishment of standing voltages on these conductors, said means including first pulse means for selectively applying a first switching voltage pulse of one polarity and amplitude to a selected conductor in one of said first and second arrays and second pulse means for selectively applying a second switching voltage pulse of opposite polarity and different amplitude relative to said first pulse to a selected conductor in the other of said arrays, the amplitudes of said first and second pulses being together sufficient to produce across the diode connected between said selected conductors a combined voltage which is at least as great as the diode's forward breakdown switching voltage, but the amplitude of each such pulse being insufficient in relation to said standing voltages to cause breakdown of another diode connected between the conductor to which such pulse is applied and another conductor on which such standing voltage may be present.

2. A circuit arrangement as defined in claim 1 wherein one of said first and second pulse means produces a switching voltage pulse which differs in amplitude from the switching voltage pulse produced by the other of said pulse means by an amount approximating to half the difference between the maximum and minimum amplitudes of the standing voltages liable to be present.

References Cited by the Examiner

UNITED STATES PATENTS

| | | | |
|---|---|---|---|
| 2,946,855 | 7/60 | Hussey | 179—18.7 |
| 2,951,124 | 8/60 | Hussey et al. | 179—18.7 |
| 2,951,125 | 8/60 | Andrews | 179—18.7 |
| 3,011,155 | 11/61 | Dunlap | 340—166 X |
| 3,020,353 | 2/62 | Heetman | 179—18.7 |
| 3,027,427 | 3/62 | Woodin | 179—18.7 |
| 3,033,936 | 5/62 | Simms | 179—18.7 |
| 3,047,667 | 7/62 | Hussey | 179—18.7 |

ROBERT H. ROSE, *Primary Examiner.*

WILLIAM C. COOPER, *Examiner.*